J. HIST.
POTATO PLANTER.
APPLICATION FILED MAY 8, 1909.

977,742.

Patented Dec. 6, 1910.
4 SHEETS—SHEET 3.

WITNESSES
R. A. Balderson
Walter Samariss

INVENTOR
John Hist,
by Bakewell, Byrnes Parmelee,
his Attys

J. HIST.
POTATO PLANTER.
APPLICATION FILED MAY 8, 1909
977,742.
Patented Dec. 6, 1910.
4 SHEETS—SHEET 4.
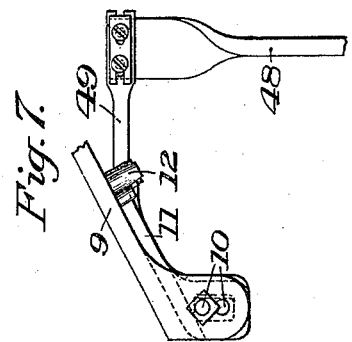
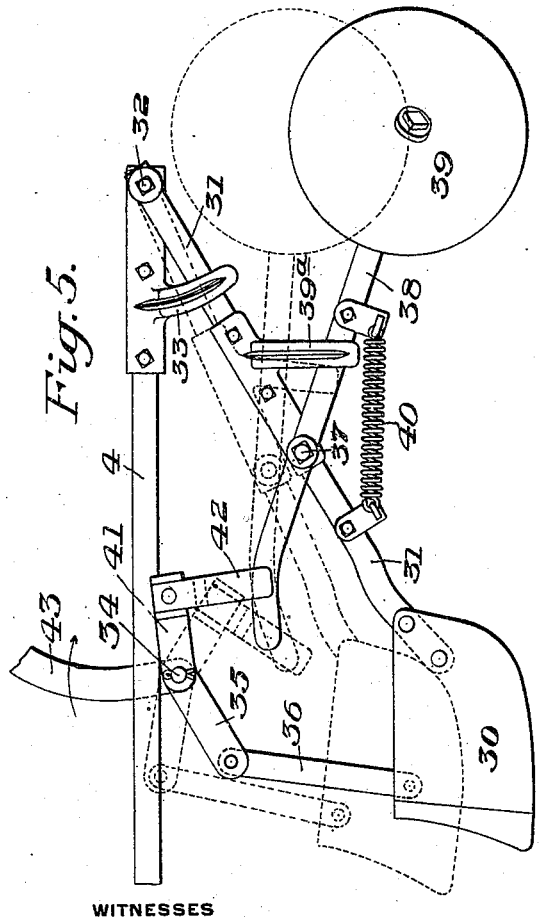
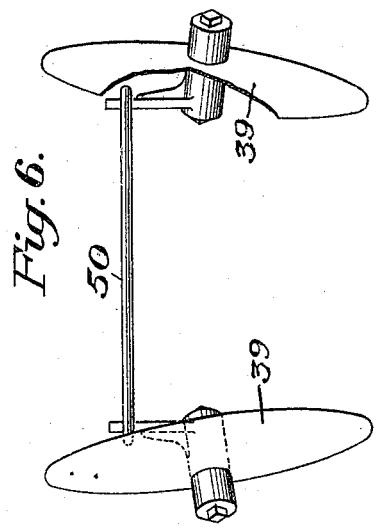
WITNESSES
R. A. Balderson
Walter Samaries
INVENTOR
John Hist,
by Bakewell, Byrnes Parmelee.
his Attys.

UNITED STATES PATENT OFFICE.

JOHN HIST, OF BARBERTON, OHIO.

POTATO-PLANTER.

977,742.  Specification of Letters Patent.  Patented Dec. 6, 1910.

Application filed May 8, 1909. Serial No. 494,892.

*To all whom it may concern:*

Be it known that I, JOHN HIST, of Barberton, county of Summit, and State of Ohio, have invented an Improvement in Potato-Planters, of which the following is a full, clear, and exact description, reference being had to the accompanying drawings, in which—

Figure 1:
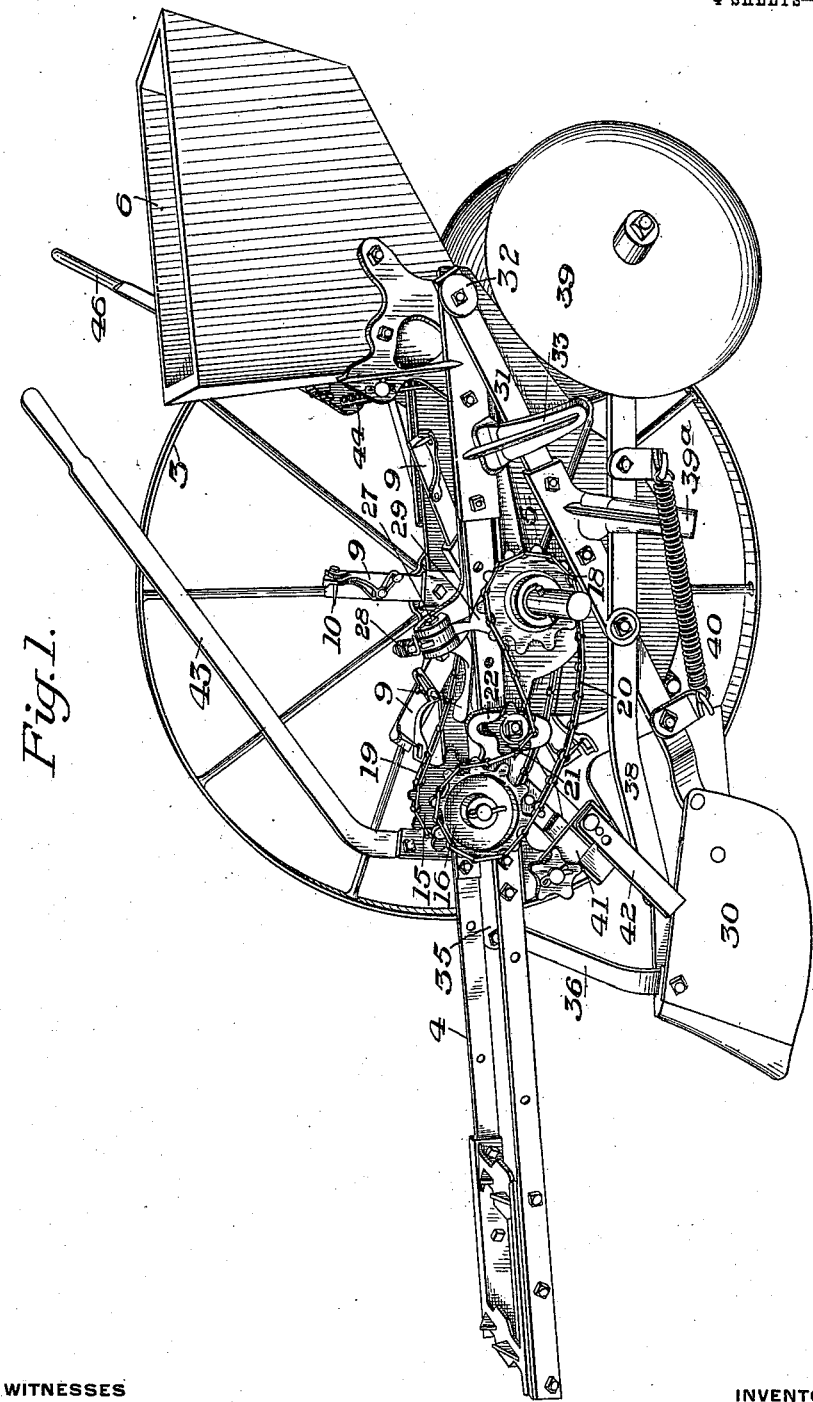
Figure 2:
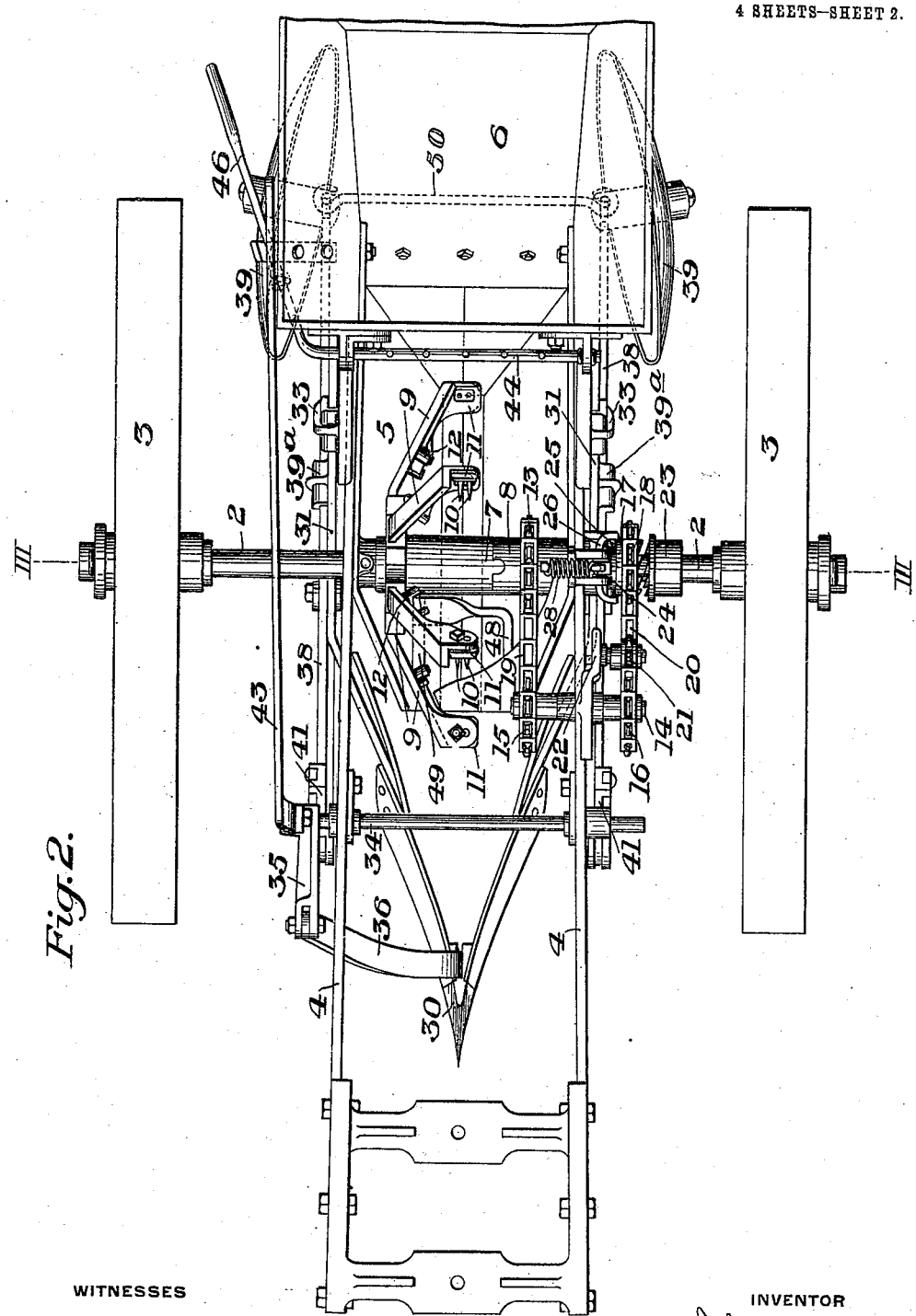
Figure 3:
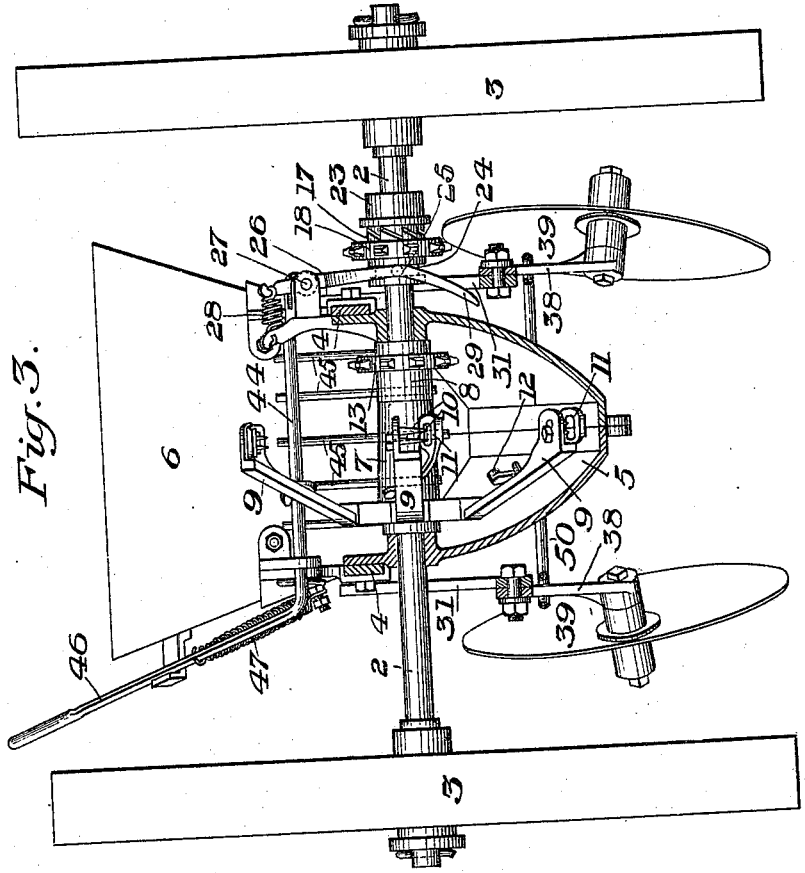
Figure 4:
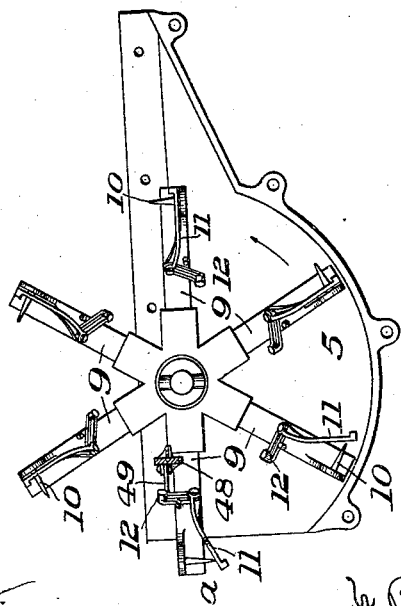

Figure 1 is a perspective view of one form of my improved planter; Fig. 2 is a plan view of the same; Fig. 3 is a partial sectional view on the line III—III of Fig. 2; Fig. 4 is a side elevation of the picker and one-half of the picker box; Fig. 5 is a detail side elevation of the plow and covering disk with their various connections, Fig. 6 is a detail rear view of the covering disks; and Fig. 7 is a detail plan view of one of the picker arms, its stripper and the cam plate for operating the stripper.

My invention relates to an improvement in automatic potato planters, and is designed to provide a cheap, simple, and efficient planter provided with a plow to open a furrow in advance of the potato feeding mechanism; and which is also provided with a covering device in the rear of the feeding mechanism to cover the potatoes which have been dropped into the furrow.

Another object of my invention is to provide means whereby the plow and covering device may be raised from contact with the ground when the planter is not in operation, and which will also automatically stop the feeding mechanism when the plow and covering devices are raised.

The precise nature of my invention will be best understood by reference to the accompanying drawings, which will now be described, it being premised, however, that various changes may be made in the details of construction, and general arrangement of the various parts, without departing from the spirit and scope of my invention, as defined in the claims.

In the drawings the numeral 2 designates the axle of the planter, and secured to each end of this axle is a wheel 3 by means of which the planter is moved over the ground which is to be seeded. As shown in the drawings these wheels are secured to the axle 2 so that the axle will be rotated when the planter is moved.

4 is the main frame of the planter and mounted thereon is a picker box 5, and a hopper 6. The sides of the picker box 5 converge toward the bottom thereof, so that the potatoes contained therein will roll to the central portion of the bottom of the picker box. Loosely mounted on the shaft 2 and within the picker box 5, are sleeves 7 and 8 which are rotatably connected to each other. Cast integral therewith or secured to the end of the sleeve 7 are the radially disposed picker arms 9. These picker arms 9 are secured to the end of the sleeve adjacent to the side of the box, and are bent inwardly at an angle which is approximately parallel with the side of the picker box. The outer ends of these arms are again bent inwardly on a line approximately parallel with the bottom of the box. Each of these picker arms is provided with a pair of prongs 10, at the end thereof, for the purpose hereinafter described. Pivotally mounted to each of these picker arms is a stripper 11, one end of which is provided with an orifice encircling the prongs 10, the other end of this stripper 11 is provided with a projection 12. Cast integral with the sleeve 8 or secured thereto in any well known manner is a sprocket wheel 13. Journaled in the frame 4 of the machine is a shaft 14 and secured thereto are sprocket wheels 15 and 16. Loosely mounted on the axle 2 is a clutch member 17, and cast integral therewith is a sprocket wheel 18.

19 is a sprocket chain connecting the sprocket wheels 13 and 15, and 20 is a sprocket chain connecting the sprocket wheels 16 and 18. This latter sprocket chain is provided with considerable slack which may be taken up by means of an idle sprocket wheel 21 which is adjustably mounted in a bracket 22 secured to the frame 4.

Secured to the axle 2 so as to rotate therewith, and adjacent to the clutch member 17 is a clutch member 23. The clutch member 17 is provided with a groove 24 which is engaged by pins 25 extending from a forked clutch lever 26 pivoted to the main frame at 27. The upper end of this clutch lever is connected by means of a spring 28 with a stationary portion of the frame, and normally tends to hold the clutch members 17 and 23 in driving relation with each other; the lower end of this clutch lever 26 is provided with a cam lever 29 which is engaged by a moving member, hereinafter described, to disengage the clutches.

30 is the plow for making a furrow in which the potatoes are to be planted. This plow is provided with a pair of rearwardly projecting levers 31, pivoted at their rear end at 32 to the main frame of the machine, and projecting from the rear end of the main frame and on each side thereof is a fork or guide 33, which engages the plow levers 31. Loosely mounted on the forward end of the frame 4 is a rock shaft 34. Connected to this rock shaft 34 is a lever 35, and connected to this lever and to the forward end of the plow 30 is a link 36.

Pivotally connected to each of the plow levers 31 at 37, is a lever 38, and journaled on the rear end of each of these levers 38 is a covering disk 39. Projecting downwardly from each of the plow levers 31 is a fork or guide 39$^a$ each of which engages one of the covering disk levers 38 so as to retain the disk levers in parallel relation with each other. The lower ends of the plow levers 31 and disk levers 38 are connected to each other by means of a tension spring 40, which tends to draw the ends of the levers together and thereby move the plow and the covering disks downwardly toward the ground. Connected to each end of the rock shaft 34 is a lever 41, each of which is provided with a forked end 42 which engages the end of the levers 38; and connected to this rock shaft 34 is a hand lever 43. When this hand lever 43 is rocked or moved downwardly in the direction of the arrow, the plow 30 and the covering disks 39 will be raised into the position shown by the dotted lines in Fig. 5, and when these levers assume the position shown in dotted lines, the cam projection 29 of the clutch lever 26 will be struck by one of the levers 31 which will disengage the clutch members 17 and 23, and thereby disengage the driving mechanism for the picker arms 9.

The feed hopper 6 is mounted to the rear of the picker box 5 and slightly above the same, and is provided with an opening leading from the hopper into the picker box. Mounted transversely in front of the opening between the hopper and the picker box is a shogger or agitator 44 which is provided with a series of downwardly extending rods 45, and is also provided at the end thereof with a lever 46 which is held in its rearward position, by means of a spring 47.

Connected to the forward end of the picker box 5 is a rearwardly extending bar 48, the end of which is bent inwardly and is provided with a cam plate 49 in line of movement of the projections 12 on the strippers 11.

50 is a link which connects the rear ends of the levers 38 to which the covering disks are journaled to prevent the spreading of these levers due to the angular position of the disks 39, which are diverged in order to move the soil over the furrow which has been made by the plow.

The operation of the machine is as follows: Assuming that the hopper has been filled with seed potatoes and the machine is at the point where the potatoes are to be planted, the machine is moved forwardly and by the rotation of the wheels 3, through the medium of the clutch members 17 and 23, and the various sprocket wheels and their driving connections, the picker arms will be rotated in the direction of the arrow on Fig. 4. The prongs 10 on each of the picker arms will pick up a potato while passing through the picker box, and as soon as the picker arms reach the point $a$ (see Fig. 4) the projection 12 on the stripper will engage the cam plate 49 and move the stripper into position shown at $a$, thereby stripping the potato from the prongs 10 and dropping it in the furrow in the rear of the plow. When the covering disks 39 pass this point they will scrape the soil from both sides of the furrow and cover the potatoes dropped therein. If one of the disks should strike a stone or any obstruction, while the planter is moved along over the furrow which is being planted, it will be elevated to pass over the rock without elevating the disk on the other side of the planter, and as soon as it has passed the rock it will be drawn to its proper position by means of its spring 40. As soon as the end of the field is reached, the operator depresses the lever 43 which will raise the plow 30 and the disks 39, which will also disengage the clutch member and thereby stop the further feeding of potatoes. If the potatoes should become clogged in the opening between the feeding hopper and the picker box 5, the operator can dislodge them by moving the rod 46 which will operate the shogger 45 and thereby break up the clogged bank of the potatoes and allow them to feed forward into the picker box.

The advantages of my invention result from the provision of a planter which is provided with a plow and covering disks which are pivotally connected to the frame of the machine, and which may be raised out of contact with the ground when the planter is moved over places where no seed is to be planted. Also from the provision of independently connected covering blades, so that one of the blades can be raised without effecting the other. Further from providing proper guides and flexible connections so that the mechanism on each side may be raised substantially in a parallel line without affecting the mechanism on the opposite side when the same meets with any obstruction. Further from providing driving mechanism for the picker which will be automatically thrown out of operation when the plow and covering devices are raised from the ground.

A further advantage results from the downwardly tapered picker box in which the picker arms are mounted so as to rotate along the side and bottom of the box. The tapered sides of the box will cause the potatoes to roll toward the central portion of the bottom thereof and in line of movement of the prongs, even though the side of a hill is being seeded. By mounting the picker arms at the side of the box and bending them so that they pass through the potatoes along the side of the box, the potatoes will be thrown into the line of movement of the prongs on the incoming arms by the outgoing arms. In the type of planters known to the art which are provided with radial arms and which rotate approximately in the line of movement of the prongs or picking mechanism the outgoing arms draw the potatoes from the prongs on to the incoming arms.

It will readily be understood by those familiar with the art that various lever connections of the plow and covering disks may be changed without departing from my invention, and it will also be understood that the wheels may be loosely mounted on trunnions projecting from the side of the frame and that the clutch member 23 might be cast integral with the hub of one of the wheels.

I claim:

1. A potato planter having a main frame mounted on a pair of wheels, a plow frame pivotally attached to the rear end of the main frame, a covering device pivotally attached to the plow frame and independent of the main frame, a rotary potato dropping device located between the plow and covering device, means for rotating the dropping device, means for raising the plow and covering device from the ground, and means operated by the connections between the plow and covering device for disengaging the driving mechanism from the dropping device when they are raised from the ground; substantially as described.

2. A potato planter having a main frame mounted on an axle, a wheel secured to each end of said axle so as to be rotated thereby when the planter is moved, a plow frame pivotally attached to the rear end of the main frame, a covering device pivotally connected to the plow frame and independent of the main frame, a rotary potato dropping device located between the plow and covering device, means for rotating the dropping device, means for raising the plow and covering device from the ground, and means operated by the connections between the plow and covering device for disengaging the driving mechanism from the dropping devices when they are raised from the ground; substantially as described.

3. A potato planter having a main frame mounted on an axle, a wheel secured to each end of said axle so as to rotate the axle when the planter is moved, a plow pivotally connected to the main frame, a covering device on each side of the plow, each having an independent pivotal connection with the plow frame and arranged for free movement thereon, a rotary potato dropping device located between the plow and covering devices, means for rotating the dropping device, means for raising the plow and covering device from the ground, and means operated by the connections for the covering devices for disengaging the driving mechanism from the dropping device when they are raised from the ground; substantially as described.

4. A potato planter having a main frame mounted on an axle, wheels secured to the ends of said axle to rotate the axle when the planter is moved, a plow having a rearwardly extending frame pivotally connected to the main frame, a covering device on each side of the plow and pivotally connected thereto, said covering devices being adapted to move freely on their pivotal connections and independent of each other, a rotary potato dropping device located between the plow and covering devices, means for rotating the dropping device, means for raising the plow and covering devices from the ground, and means operated by the connections for the covering devices for disengaging the driving mechanism from the dropping device when they are raised from the ground; substantially as described.

5. A potato planter of the character described, having a main frame supported on a pair of wheels, a plow having a frame pivotally connected to the main frame, a covering device on each side of the plow each covering device having a pivotal connection with the plow frame and adapted for free movement independent of each other, a rock shaft, a crank and link connection between the rock shaft and plow, crank connections between the rock shaft and the covering devices so that when said rock shaft is rocked the plow and covering devices will be raised from the ground, and a spring to draw the plow and covering devices toward the ground; substantially as described.

6. A potato planter having a main frame mounted on wheels, a plow having a frame pivotally connected to the main frame, guides projecting from the main frame for the plow frame, a lever pivoted to each side of the plow frame, a covering disk journaled on the rear end of each of the levers, a guide projecting from the plow frame for each of the levers, a rock shaft mounted on the main frame, a crank and link connection between the rock shaft and the plow, crank connections between the rock shaft and the disk levers whereby said plow and disks can be raised from the ground when the rock shaft is moved, and a spring connection between each of the disk levers and the plow frame which tends to hold the plow and the disks in contact with the ground; substantially as described.

7. A potato planter having a main frame mounted on wheels, a plow having a frame pivotally connected to the main frame, a pair of levers pivoted to the plow frame, a covering disk journaled on the rear end of each of the levers, a flexible connection connecting the rear ends of the disk levers to each other, and means to raise the plow and covering disk from the ground; substantially as described.

8. A potato planter having a main frame mounted on wheels, a plow having a frame pivotally connected to the main frame, guides projecting from the main frame for the plow frame, a pair of levers pivoted to the plow frame, a covering disk journaled on the rear end of each of the levers, a guide projecting from the plow frame for each of the levers, a link connecting the rear ends of the levers to each other, and means to raise the plow and the covering disks from the ground; substantially as described.

9. A potato planter having a main frame mounted on a pair of wheels, a plow frame pivotally attached to the main frame, a covering device pivotally connected to the plow frame, a potato dropping device located between the plow and covering device, a fixed clutch member mounted so as to be rotated by one of the wheels, a movable clutch member slidably mounted so as to be thrown into and out of engagement with the clutch member, driving connections between the movable clutch member and the potato dropping device, means for raising the plow and covering device from the ground, and means actuated by the movement of the plow frame for disengaging the clutch members when the plow and covering device are raised from the ground; substantially as described.

10. A potato planter of the character described, a main frame supported on a pair of wheels, a plow having a frame pivotally connected to the main frame, a covering device on each side of the plow, each covering device having an independent pivotal connection with the plow frame, and adapted for free movement independent of each other, each of said covering devices having an arm extending beyond the plow frame, a rock shaft, a crank and link connection between the rock shaft and the plow frame, a pair of rearwardly extending cranks on the rock shaft arranged to engage the extensions on the covering devices, and a lever for rocking the shaft to raise the plow frame and the covering devices from the ground; substantially as described.

11. In a potato planter having a main frame mounted on wheels, a plow having a frame pivotally connected to the main frame, a pair of levers pivoted to the plow frame and adapted for free movement independent of each other, a covering device connected to the rear end of each of the levers, means to hold the levers from spreading, and means to raise the plow and covering devices from the ground; substantially as described.

12. A potato planter having a main frame mounted on wheels, a plow having a frame pivotally connected to the main frame, a pair of levers pivoted to the plow frame and adapted for free movement independent of each other, a covering disk journaled on the rear end of each of the levers, a flexible connection between said levers arranged to prevent the spreading of the levers, and means to raise the plow and covering disks from the ground; substantially as described.

13. A potato planter having a main frame mounted on wheels, a plow having a frame pivotally connected to the end of the main frame, a lever pivoted to each side of the plow frame, and adapted for free movement independent of each other, a covering disk journaled on the rear end of each of said levers, a rock shaft mounted on the main frame, and means connected to the rock shaft to move the plow frame and covering disk levers in opposite directions to raise them from the ground; substantially as described.

14. A potato planter having a main frame mounted on wheels, a plow having a frame pivotally connected to the main frame, a pivoted lever on each side of the planter, a covering disk journaled on the rear end of each of the levers, each of said levers being pivoted so as to be capable of free movement independent of the other lever, and means connected to each lever to normally hold the disks in contact with the ground; substantially as described.

15. A potato planter having a main frame mounted on wheels, a plow having a frame pivotally connected to the main frame, a pair of levers pivoted to the plow frame, a covering disk journaled on the rear end of each of the levers, each lever being pivoted so as to be capable of a free vertical movement independent of the other lever, and a spring connected to each lever for normally holding the disks in their lowered position; substantially as described.

16. A potato planter having a main frame mounted on wheels, a plow having a frame pivotally connected to tthe main frame, a pivoted lever on each side of the potato planter, each lever being pivoted so as to be capable of a free vertical movement independent of the movement of the other lever, a covering disk on each lever, a tension device connecting each of the levers with the plow frame and adapted to move the levers independent of each other, and means to raise the plow and covering disks from the ground; substantially as described.

In testimony whereof, I have hereunto set my hand.

JOHN HIST.

Witnesses:
 STEPHEN C. MILLER,
 JOHN W. McCOY.